(12) United States Patent
Spitz

(10) Patent No.: US 8,390,824 B1
(45) Date of Patent: Mar. 5, 2013

(54) LASER BASED FOCUSING METHOD

(75) Inventor: Glenn S. Spitz, Boulder, CO (US)

(73) Assignee: Webscan, Inc., Longmont, CO (US)

( * ) Notice: Subject to any disclaimer, the term of this patent is extended or adjusted under 35 U.S.C. 154(b) by 115 days.

(21) Appl. No.: 13/184,498

(22) Filed: Jul. 16, 2011

(51) Int. Cl.
*G01B 11/14* (2006.01)
(52) U.S. Cl. ............................................ 356/616
(58) Field of Classification Search .................. None
See application file for complete search history.

(56) References Cited

U.S. PATENT DOCUMENTS

| | | | |
|---|---|---|---|
| 5,453,784 A | 9/1995 | Krishnan et al. | |
| 6,614,537 B1 * | 9/2003 | Yahashi | 356/602 |
| 6,689,998 B1 * | 2/2004 | Bremer | 250/201.2 |
| 7,303,131 B2 | 12/2007 | Carlson et al. | |
| 7,726,573 B2 | 6/2010 | Gurevich et al. | |
| 2006/0038017 A1 | 2/2006 | Carlson et al. | |
| 2010/0294839 A1 | 11/2010 | Kawashima et al. | |

* cited by examiner

*Primary Examiner* — Tu Nguyen
(74) *Attorney, Agent, or Firm* — Island Patent; F. Scott Tierno

(57) ABSTRACT

A method for adjusting an object distance for focusing upon a face of an item, including a data carrying graphical that is placed within a field-of-view of a fixed focal length imaging device. The method employs using parallax focusing techniques to produce a laser spot indicator, and further calls for providing a fixed on-screen focusing target to indicate a location to which the laser spot indicator must be moved and positioned before in-focus imaging activities can be realized. This abstract is provided to comply with rules requiring abstracts, and is submitted with the intention that it will not be used to interpret or limit the scope and meaning of the claims.

20 Claims, 10 Drawing Sheets

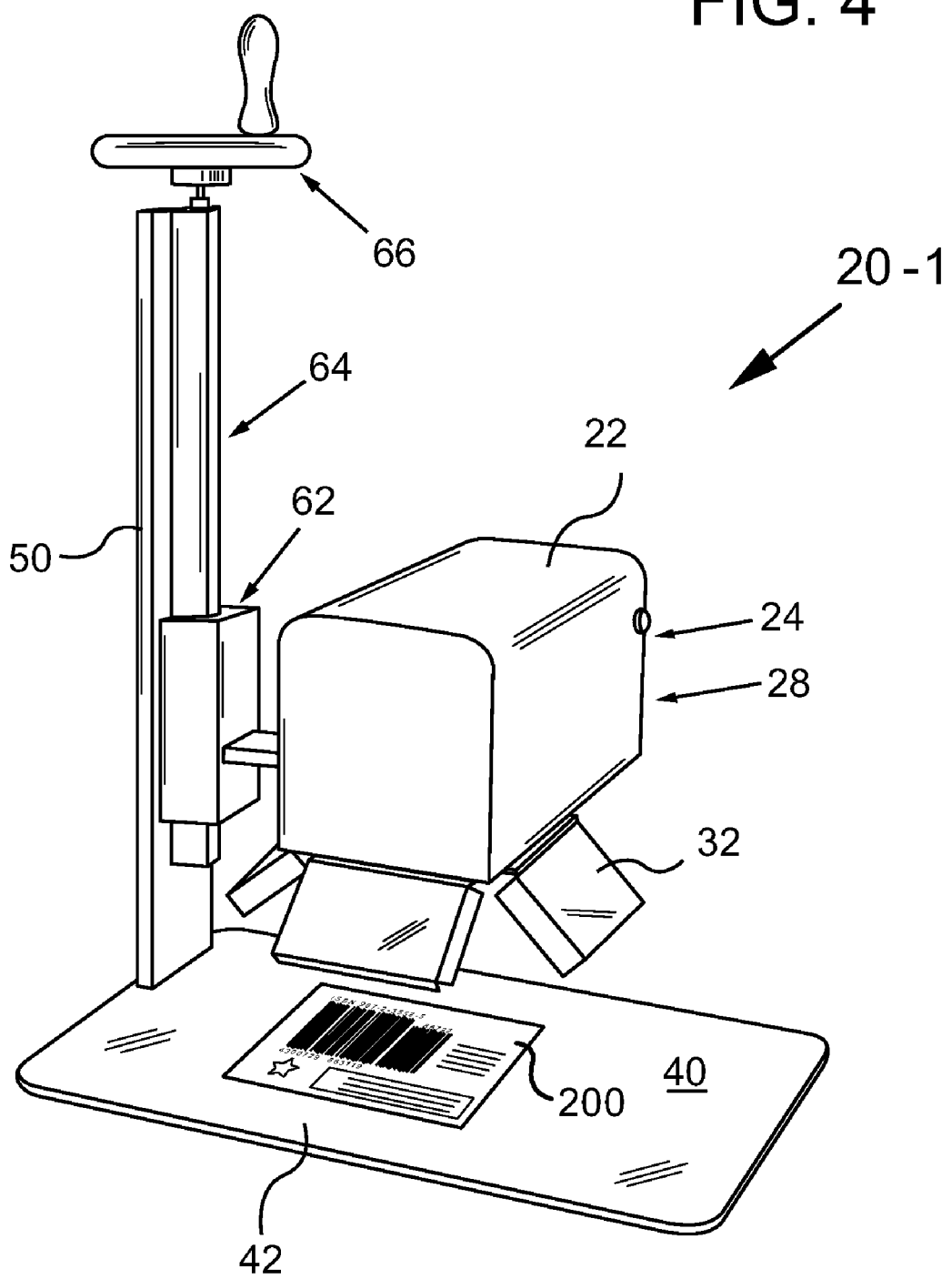

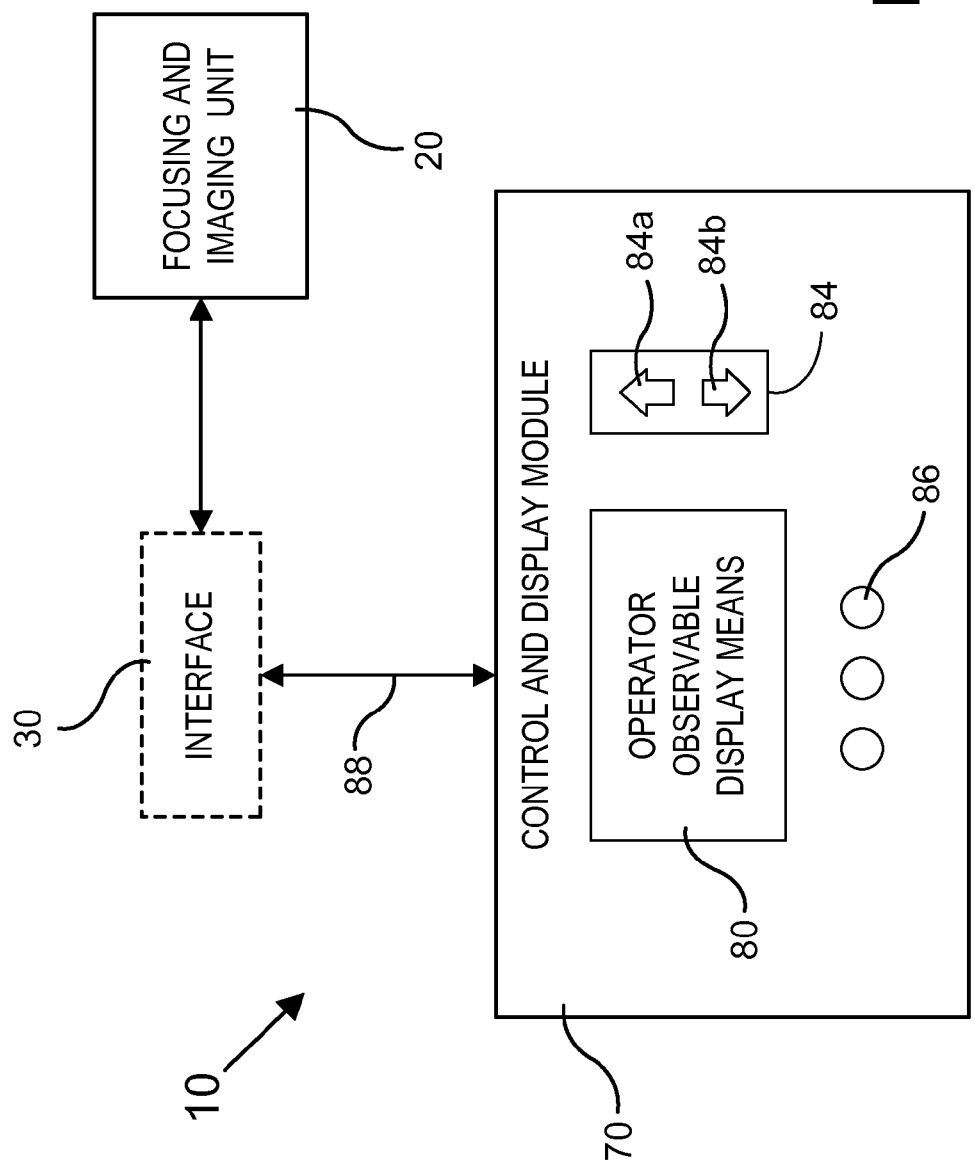

LASER BASED FOCUSING METHOD

TECHNICAL FIELD

The presently disclosed invention relates most generally to imaging systems employing fixed focal length imaging devices. More particularly, the present invention relates to embodiments of a manual and or automated laser based focusing arrangement employing a low cost fixed focal length imaging device, providable with easy to operate print quality verifiers configured for evaluating the print quality of data carrying graphical symbols, including 1-dimensional and 2-dimensional barcode symbols.

BACKGROUND

There is a well established need to quickly and accurately focus imaging devices upon data carrying graphical symbols, such as common 1-dimensional and 2-dimensional barcode symbols found on most manufactured items. One in-focus imaging requirement comes when there is a need to accurately and quantitatively verify and report print quality evaluation results. FIG. 1 provides an example of a common 1-dimensional data carrying graphical symbol 100 that is comprised of bar elements 100a and space elements 100b. As shown, in FIG. 2, a data carrying graphical symbol 100 may be printed or otherwise disposed upon physical items such as a product package 210 (possibly via a label 200). Clearly the height or thickness of such packages may vary considerably. Accordingly, when a particular package is placed upon a support surface (e.g., a support base or table) of a verifier apparatus, the height of the top surface of the package—upon which the graphical symbol is located—may certainly vary. Another issue arises when the shape or surface upon which a label is located is curved, such as a label placed on the inside or outside of a concave or bowl-shaped item.

As such, it would be most desirable to provide a preferably overhead imaging and focusing arrangement, that utilizes a fixed focal length imaging device, while further readily enabling an individual (with very minimal training) to place the item within the field-of-view of the imaging device, and easily and accurately adjust the distance between the imaging device and a face of the item upon which a data carrying graphical symbol is located. Further, the method and means would readily support a focusing method that would reduce false or inaccurate evaluation results resulting from imaging poorly focused data carrying graphical symbols.

A number of other notable characteristics, advantages, and or associated novel features of the present invention will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, a means and method are provided for utilizing parallax focusing techniques, in conjunction with a fixed on-display focusing target, for adjusting the distance between a fixed focal length imaging device and an item of interest to be imaged. Current teachings employ parallax focusing techniques to determine the distance to an object of interest, and then use the determined distance for adjusting a variable focal length imaging device. In contrast, the present invention calls for using a fixed on-display focusing target to aid in setting the distance between a face the item being imaged and the imaging device. That is, a suitable adjustment means is employed for selectively changing the distance between the (fixed focal length) imaging device and the item of interest to be imaged. Once the distance is set, so that the face to be imaged is at the focal plane of the imaging device, imaging data can be collected and processed, as needed.

In particular, the method of the invention calls for activating of a laser source for producing a laser beam and an associated laser spot indicator. Importantly, the laser source is suitably aimed, aligned, and mounted at a fixed oblique angle such that the laser beam intersects the face of an item of interest at a location that is determined by the actual distance between the imaging device and the face of the item of interest. The method further calls for repeatedly displaying, upon an available display means, images captured by the imaging device including the face of the item of interest and the laser spot indicator. At the same time a fixed on-display pre-determined focusing target is superimposed over the captured images.

Importantly, the focusing target is provided for indicating where the laser spot indicator must be positioned in order to focus the imaging device upon the face of the item of interest. This position is pre-determined, and stored for use as needed. The adjusting of the distance between the imaging device and the item of interest, most preferably along an axis that is substantially parallel to the optical axis, is employed for effecting a moving and positioning of the laser spot indicator so that the laser spot indicator is substantially centered within the fixed on-screen focusing target. Once positioned within the center of the focusing target, the face of the item of interest is now located at the focal plane of the imaging device, and is now properly focused to enable (further) imaging and or processing activities (possibly including print quality evaluation reporting).

BRIEF DESCRIPTION OF THE DRAWINGS

In the drawings, like elements are assigned like reference numerals. The drawings are not necessarily to scale, with the emphasis instead placed upon the principles and features of the present invention. Additionally, each of the embodiments depicted are but one of a number of possible arrangements utilizing the fundamental components and concepts of the present invention. The drawings are briefly described as follows:

FIG. 4 depicts an example construction of a focusing and imaging unit, wherein a lead-screw structure is employed with a top-positioned manual crank wheel for enabling an operator to manually increase or decrease the distance between the imaging device and a face of an item of interest.

FIG. 6A is a representative high level block diagram of an apparatus employing a focusing and imaging unit of the invention that supports a manual adjusting of the distance between the imaging device and the item of interest, preferably controlled by an operator using a suitable user interface.

Figure 1:
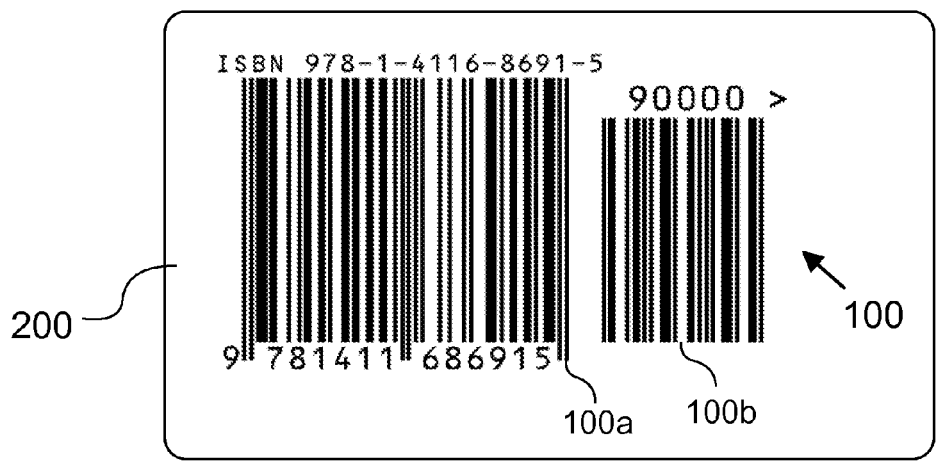
FIGS. 1 and 2 provide examples of items of interest, which as depicted may include data carrying graphical symbols in the form of a 1-dimensional barcode (shown) or a 2-dimensional barcode (not shown).

PARTIAL LIST OF REFERENCE NUMERALS 10, 10-1—imaging and evaluation system
20, 20-1—focusing and imaging unit
22—housing
24—(fixed focal length) imaging device
28—laser source
28a—laser beam
28aa—laser spot indicator
28aa-0—(orig. position of) laser spot indicator
30—interface
32—lighting module
34—optical axis
36—focal plane
40—support table (surface)
42—horizontal support base
42-1—motor housing support base
48—upper operator user interface module
50—fixed vertical support
52—fixed horizontal support
54—support bracket
60—height adjustable support
60-1—height adjustable support table
62—up-down movable coupling
64—lead-screw structure
66—hand-crank
70—control and display module
70-1—portable computing device
78—(first) focusing target
78a—center (of 78)
78-1—second focusing target
80—operator observable display means
82—display screen (shot)
84—operator controls
84a—first operator pushbutton
84b—second operator pushbutton
84c—third operator pushbutton
86—annunciator
100—data carrying graphical symbol
100a—bar element
100b—space element
200—label
210—package (or product)
A—angle
D—distance
H—height

DETAILED DESCRIPTION OF EMBODIMENTS
OF THE INVENTION

It is important to establish the definition of a number of descriptive terms and expressions that will be used throughout this disclosure. As will also be discussed and defined in the following sections and claims, the terms 'item' and 'item of interest' may include any of a variety of data carrying graphical symbols. For example, data carrying graphical symbols certainly would include 1-dimensional and 2-dimensional barcode symbols, as well as others well known to skilled individuals. Indeed, in some situations the item may be a single data carrying graphical symbol in the form of a barcode. Further it may be assumed that each item will have or provide a face (surface or side) upon which the information coded and data carrying graphical symbol is printed, placed, or otherwise disposed. The face of the item may also be assumed to have a 'center' or 'center portion' which will preferably be located (by an operator) quite proximate to the optical axis of the fixed focal length imaging device. For example, in cases where the item is, or includes, a 1-dimensional barcode indicia, the center portion of the face to be imaged may be assumed to be the middle or center of the barcode indicia. The term 'laser spot indicator', which will be used to describe a projected "aligning spot", is preferably produced by a laser beam that is aimed at the focal plane of the imaging device for intersecting the focal plane at a fixed oblique angle. As understood by skilled person familiar with parallax focusing techniques, the laser spot will not be round, and may actually be more elliptical in shape.

Continuing, the expressions 'in-focus', 'properly focused', and 'ready for imaging activities' are to be considered synonymous and indicate that the item (e.g., a data carrying graphical symbol of interest) is now located within the field-of-view of the imaging device and is properly spaced from the imaging device (i.e., located at the focal plane) so that high quality images may be collected and processed. In addition, these high quality imaging activities will generally result in a collecting of image data of the face of the item. The collected image data may then be subsequently processed for various purposes. For example, the data processing may produce (and preferably report) a 'print quality evaluation result'. Such processing, which may also be termed 'print quality evaluation activities', may most preferably result in at least one 'print quality attribute' being reported to an operator or other interested party. It may be assumed that the expression 'distance between the imaging device and the item' may be understood to indicate the distance between a lens or optical imaging element of the imaging device and the face of the item (generally measured along the optical axis of the imaging device).

Continuing, the term 'substantially' will be employed as a modifier to indicate either exactly or statistically close to the given feature, structure, or characteristic. For example, the phrase 'substantially parallel' may indicate that several items/articles are exactly parallel, or say within +/−1 or 2 percent of being truly parallel. In like fashion, the expression 'substantially parallel to the optical axis', as applied to the optical axis of the imaging device, may be assumed to mean exactly parallel to the axis, or within +/−1 or 2 percent of a true parallel orientation. As will be full described hereinafter in considerable detail, the term 'substantially centered' will also be used to describe the moving and positioning of a laser spot indicator substantially within a center (e.g., a target origin or bulls-eye) of a provided focusing target. Importantly, the terms 'couple', 'coupled to', 'coupling', and the like, are to be understood to mean that two or more described items or limitations are either directly connected together, or alternately, connected to each other via one or more additional, possibly implied or inherent structures, components, etc. Other important terms and definitions will be provided, as they are needed, to properly define the present invention and its associated novel characteristics and features. In addition, the terms and expressions employed herein have been selected in an attempt to provide a full, complete, and accurate description of the invention. These terms may very well have equivalents known to skilled individuals, which may be long established in the art. As such, the terminology employed has been carefully chosen and is intended for illustration and completeness of description, and may very well have equivalents that are known in the art, but not employed here.

Referring to the drawings, and briefly returning to FIG. 1, an item or item of interest in the form of a label 200 will typically have information present upon an upper face (or surface). For example, as shown in FIG. 1 a label 200 is provided having a data carrying graphical symbol 100 in the form of a 1-dimensional barcode indicia. As such, the data carrying graphical symbol 100 in this case is composed of data encoding bar elements 100*a* and space elements 100*b*. When label 200 is printed upon a flat label substrate, it may easily be placed upon a support surface or table, and directly imaged. In this case, with the support surface located at the focal plane of a suitable imaging device, any flat labels having data carrying graphical symbol printed thereupon, will also be located at the focal plane once placed and properly located upon a support surface/table. Further, in this present case, a relatively low-cost fixed focal length imaging device may be utilized with a suitably structured module or unit, which may generically be designated focusing and imaging unit 20.

Figure 2:
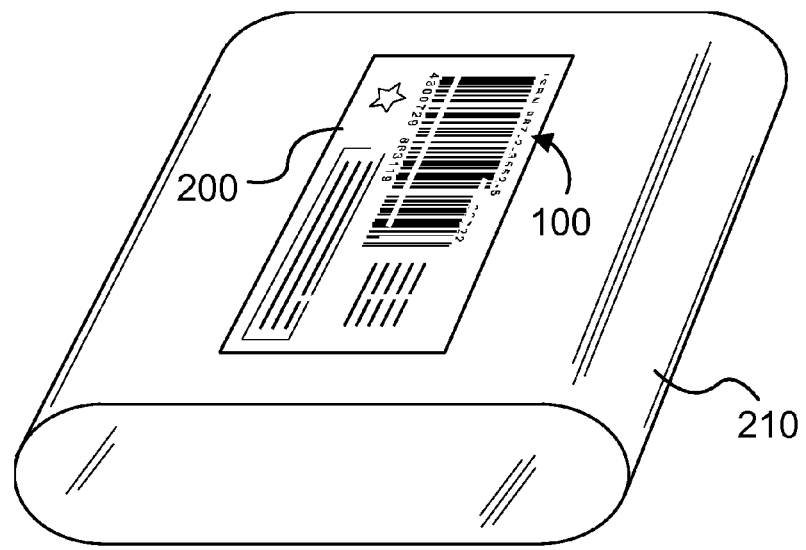

However, as shown in FIG. 2, if the label 200 is placed upon an item such as package 210, having some unknown thickness and or curvature, then placing the item upon a support surface that is located at the focal plane will result in the label 200 and data carrying graphical symbol 100 being out-of-focus. In this latter situation, there is a need to now adjust the distance between the imaging device and the face of the item, in order to locate the face of the item at the focal plane. In addressing this issue, the present invention not only enables a low cost fixed focal length imaging device to be employed, it also provides a very straight forward and foolproof focusing process that can be carried out, when needed, by individuals having a minimal level of training.

Figure 3A:
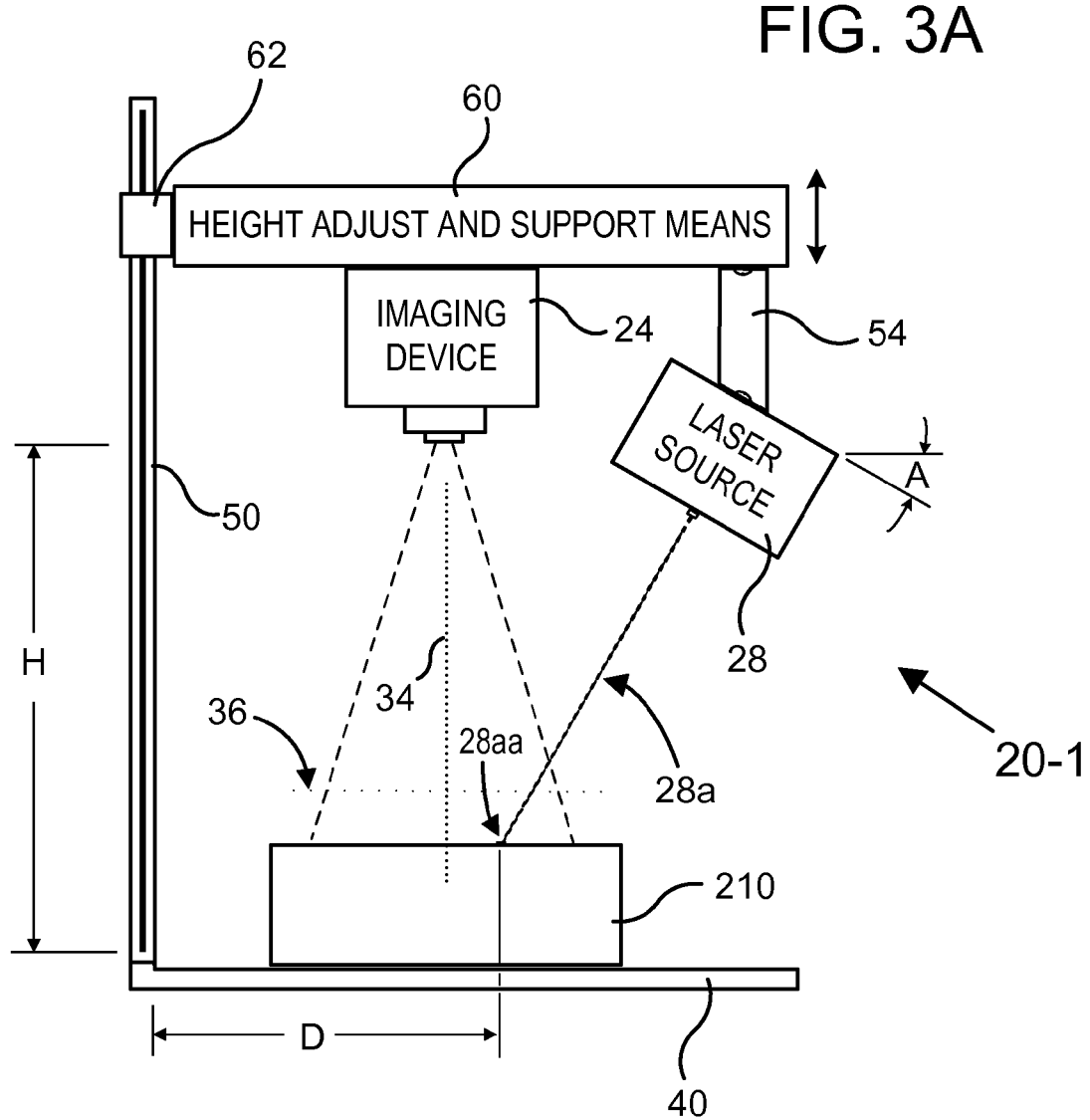
FIGS. 3A and 3B depict high level functional representations of possible embodiments of focusing and imaging units, with each employing an imaging unit having a fixed focal length and further including means to alter the distance between the imaging unit and a face of an item to be imaged, such as a data carrying graphical symbol.

Turning now to FIG. 3A, a somewhat conceptual high level block diagram of a first possibly preferred embodiment of a focusing and imaging unit 20-1 is depicted. As shown, a fixed support table 40 is coupled to a fixed vertical support 50. An up-down movable coupling 62 is preferably further employed and movably coupled to the fixed vertical support 50. The up-down movable coupling 62 enables a height adjustable support 60 to be selectively controlled and moved up and down, as required. As can be further seen in FIG. 3A, a fixed focal length imaging device 24 is fixed to the height adjustable support 60, as is a laser source 28. Importantly, and as shown in both FIGS. 3A and 3B, the laser source 28 is mounted, say by a rigid support bracket 54, for producing a laser beam 28*a* that is fixedly aimed at the focal plane 36 of the imaging device 24 for intersecting the focal plane 36 at a fixed oblique angle 'A'. The mounting of the laser source 28 in this manner provides for a visual laser spot indicator 28*aa* that is produced upon the face of the item of interest (such as a label 200 of package 210).

Accordingly, the presently shown embodiment of the focusing and imaging unit 20-1 utilizes 'parallax focusing techniques'. As understood by skilled persons, when using parallax focusing techniques with the embodiment of FIGS. 3A and 3B, an adjusting of the distance between the imaging device 24 and the face of the item of interest, designated height H, results in a moving and translating of the distance D at which the laser spot indicator 28*aa* is produced upon the face of the item. What would be most helpful is to not only provide an adjusting means for translating the laser spot indicator 28*aa*, but to also provide a clear indication of exactly "where" the laser spot indicator 28*aa* should be moved to and positioned for locating the label 200 at the focal plane 36 of the imaging device 24. This aspect of the invention, and an associated focusing method, will be fully addressed and discussed when referring hereinafter to FIGS. 7A through 7D.

Figure 3B:
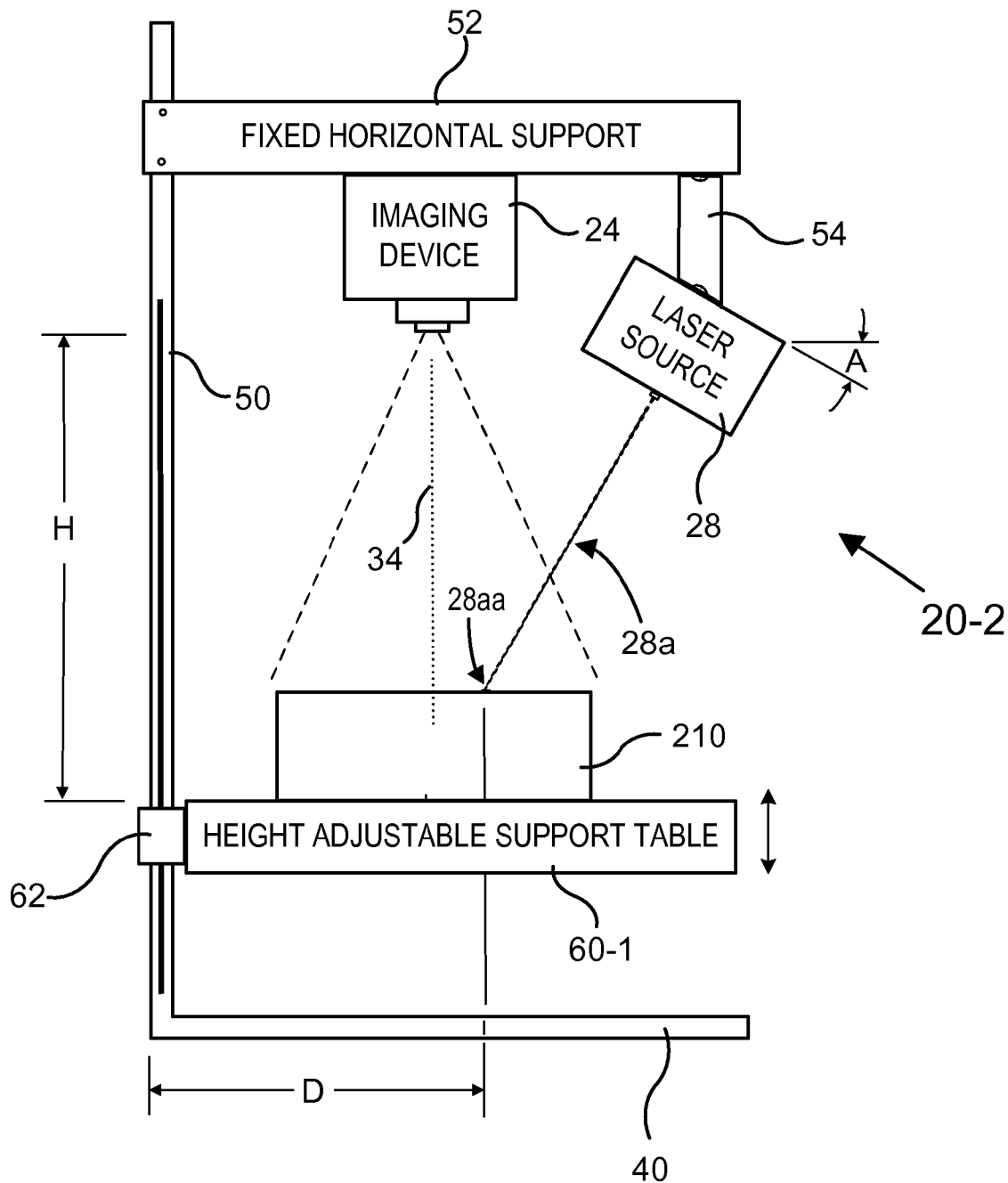

Turning now to FIG. 3B, a high level block diagram of another possibly preferred and alternate embodiment of the focusing and imaging unit, designated 20-2, is illustrated. As can be seen in FIG. 3B, the focusing and imaging unit 20-2 differs from the embodiment of FIG. 3A, by providing for an up-down adjusting of the package 210 and any included label 200. As shown, this embodiment is structured with the imaging device 24 and laser source 28 now fixedly mounted. More specifically, this alternate embodiment of the focusing and imaging unit 20-2 is structured with a height adjustable support table 60-1, which is coupled to an up-down movable coupling 62. As shown in FIG. 3B, the inclusion of the height adjustable support table 60-1 enables the height H (or equivalently the distance) from the fixed imaging device 24 and the face of the item of interest to be increased and decreased respectively, by lowering and raising the support table 60-1 (and a package 210 placed thereupon).

For clarity, it is important to understand that the height H, which is the distance between the imaging device and the face of the item to be imaged, may now be assumed to be a vertical distance between a lens or optical input of the imaging device and the face of the item to be focused upon and imaged. Further, and as understood by skilled persons, it is most desirable to locate any included data carrying graphical symbol 100 (to be imaged) quite proximate to the optical axis 34 of the imaging device 24. Thus, a locating of a 'center portion of the face of an item', such as a 1-dimensional or 2-dimensional barcode indicia, proximate to the optical axis is most preferable before commencing imaging, processing, and subsequent print quality evaluation activities.

It may also be noted that when referring generically to a focusing and imaging unit, a designation used will be 'focusing and imaging unit 20'. When needing to refer to a specific version or embodiment of a focusing and imaging unit, the designations 20-1, 20-2, etc., will be employed. Importantly, the principles and features of the present invention may be applied to apparatus having a variety of architectures and associated structures. For example, a first adjustment arrangement, which is possibly a lowest cost embodiment, may employ a simple manual adjustment means, say using a hand-crank structure and lead screw. However, as understood by skilled individuals many varied adjustment mechanisms are available that may be incorporated into focusing and imaging units 20 of the invention. Several high level and possibly preferred examples will be provided for clarity and completeness, but many are possible.

As shown in FIG. 4, a first manually controlled embodiment of a focusing and imaging unit 20-1 may include a fixed vertical support 50 structured with a lead-screw structure 64 and an hand-crank 66. The lead-screw structure 64 and the hand-crank 66 would be provided as portions related to up-down movable coupling 62 and the fixed vertical support 50. Clearly the focusing and imaging unit 20-1 of FIG. 4 would enable an operator to place an item such as a data carrying graphical symbol within the field-of-view of a fixed focal length imaging device 24, and readily adjust the distance between the imaging device and the face of the item by rotating the hand-crank 66. Importantly, such an adjusting of the distance between the imaging device and the data carrying graphical symbol being imaged (preferably along an axis that is substantially parallel to the optical axis), is intended to result in a moving of the face of the item to the focal plane. As will be discussed in more detail hereinafter, a very clear indication that the face is at the focal plane will be provided to an operator by utilizing what will be termed a 'fixed on-screen focusing target', along with a projected laser spot indicator 28*aa*. More specifically, the fixed on-screen focusing target will clearly indicate to an operator where the laser spot indicator must be moved to (and positioned at), in order for the face of the item to be in-focus at the focal plane of the imaging device.

Returning briefly to FIG. 4, one possible example of a housing 22 is provided to house and support a number of portions of the imaging and focusing unit 20-1. These portions may include the imaging device 24 and the laser source 28. Additionally shown, and included with many indicia verifier apparatus is at least one lighting module 32. As can be seen in FIG. 4, as well as FIG. 5, an item may be placed within the field-of-view of the imaging device 24 when placed upon a support surface, such as support table 40, which is provided by the horizontal support base 42 (as shown).

Figure 5:
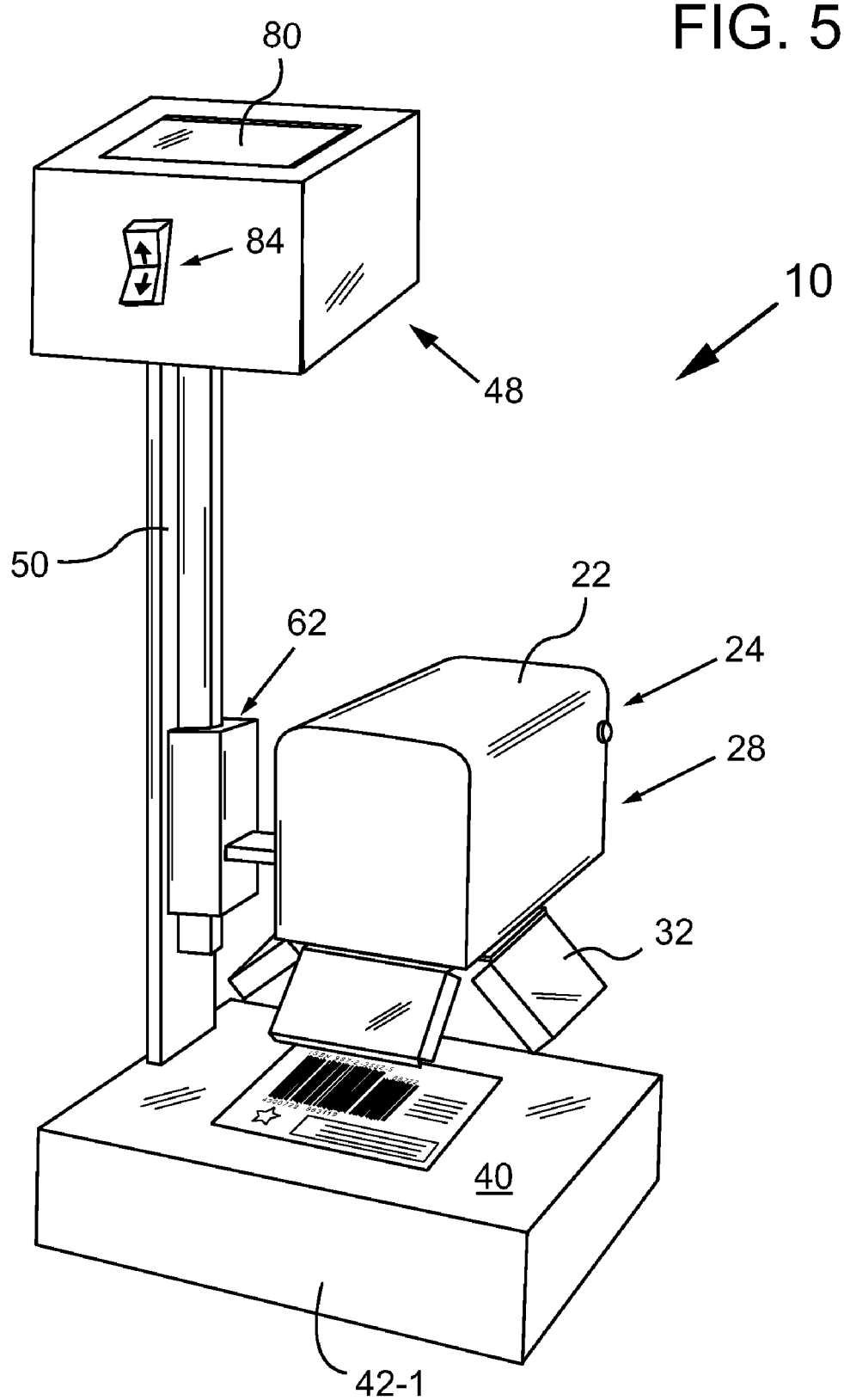
FIG. 5 depicts another possibly preferred embodiment of a focusing and imaging unit, wherein an electro-mechanical adjustment mechanism enables a selective increasing and or decreasing of the distance between the imaging device and the face of the item in order to locate the face (surface) to be imaged at the focal plane of a fixed focal length imaging device.

Turning now to FIG. 5, another possible embodiment of the invention is shown employing an electro-mechanical adjustment mechanism. However, it must be understood that many functionally equivalent adjustment mechanisms and means are possible that may employ the principles of the present invention. For the imaging and evaluation system 10 of FIG. 5, which also represents a fully standalone verifier apparatus, an upper operator user interface module 48 is included. As depicted, the upper operator user interface module 48 includes an operator observable display means 80 and operator controls 84. For example, the operator observable display means 80 may include a common graphics LCD module, while the operator controls may include at least one up-down momentary rocker switch (as illustrated in FIG. 5).

In addition, the apparatus 10 of FIG. 5 further includes a motor housing support base 42-1, and a raised item support table (or surface) 40. The motor housing support base 42-1 may house various electro-mechanical modules, in addition to a motor arranged for causing a moving of the up-down movable coupling 62, and therefore the imaging device 24 and laser source 28. It may be noted that the functions of the upper operator user interface module 48 may alternately be provided by (and within) the motor housing support base 42-1, and clearly provide an equivalent functionality.

Turning again to FIG. 5, and as understand by skilled individuals, a large variety of possible mechanical structures may be provided to implement a suitable electro-mechanical mechanism for use in enabling and controlling an adjusting of the distance between the imaging device and the item being imaged. For example, a possibly preferred arrangement would add a motor to drive the lead-screw structure of FIG. 4. Commonly employed electro-mechanical motor driven adjustment mechanisms may be arranged to be manually controlled, and or controlled by an included controller or computer, preferably using digital image processing techniques to determine when the laser spot indicator 28*aa* is and is not centered within a center 78*a* of a (possibly first) focusing target 78.

Figure 6B:
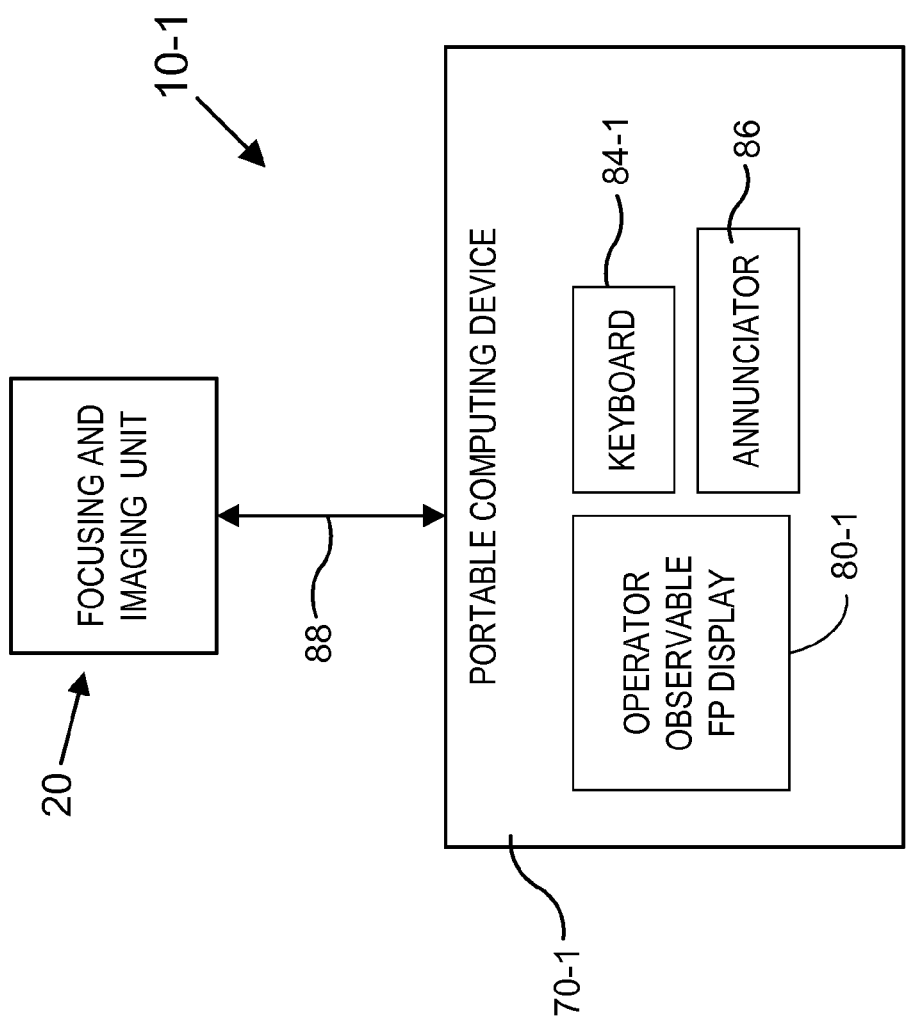
FIG. 6B provides a high level block diagram of another possible apparatus of the invention, consistent with the embodiment of FIG. 4A, utilizing a ubiquitous personal computing device such as a notebook or laptop computer to implement an equivalent to the control and display module.

Referring now to FIGS. 6A and 6*b*, a better understanding the broad means and methods of the invention can be gained by examining several high level and functional block diagrams of the focusing and imaging units 20 and associated imaging and evaluation systems 10. As shown in FIG. 6A, a first substantially self-contained imaging and evaluation system 10 includes a focusing and imaging unit 20, which is coupled to a control and display module 70. The coupling interface module 30 may be provided as a separate component module, or equivalently included within at least one of the focusing and imaging unit 20 and the imaging and evaluation system 10.

A key feature of the embodiment of FIG. 6A is the inclusion of the control and display module 70 that may be structured with an operator observable display means 80 and one or more operator controls 84. For example, as shown in FIG. 6A, the operator controls may include a first operator pushbutton 84A (an UP key) and a second operator pushbutton 84B (a DOWN key), for enabling an increasing and decreasing (respectively) of the distance between the imaging device and the face of an item of interest. Further one or more annunciators 86 may be included. For example, annunciators may include one or more LED indicators, as well as an audio sounder or other useful output devices.

Figure 7A:
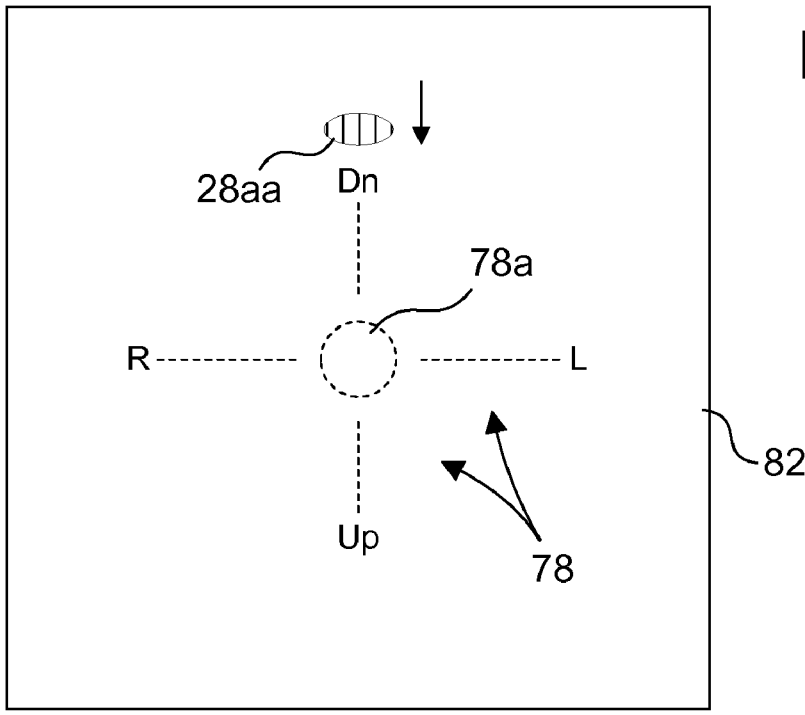
FIGS. 7A through 7D depict a sequence wherein a moving and positioning of a laser spot indicator is effected, with the laser spot indicator being moved and positioned within a center of a fixed on-screen focusing target.
Figure 7B:
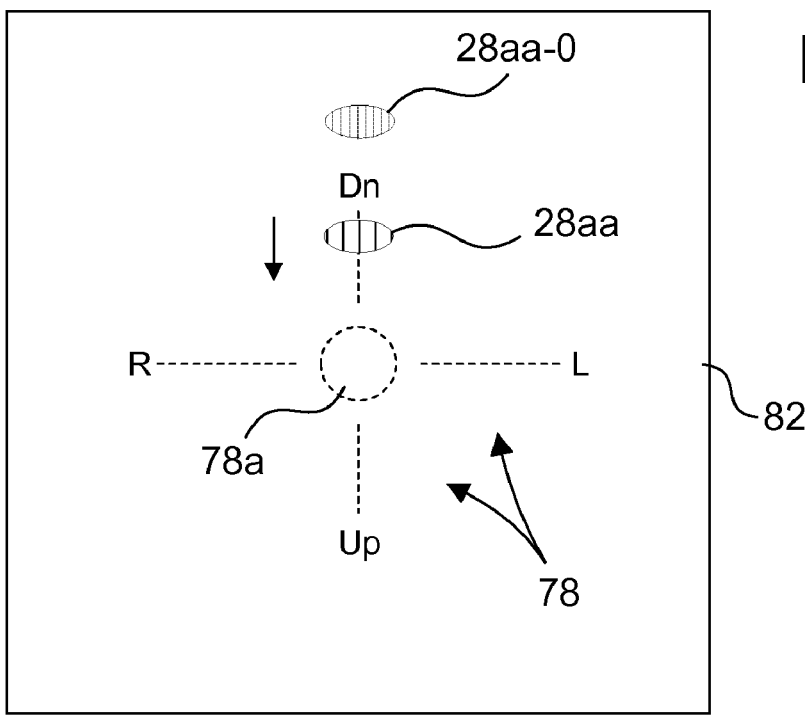
Figure 7C:
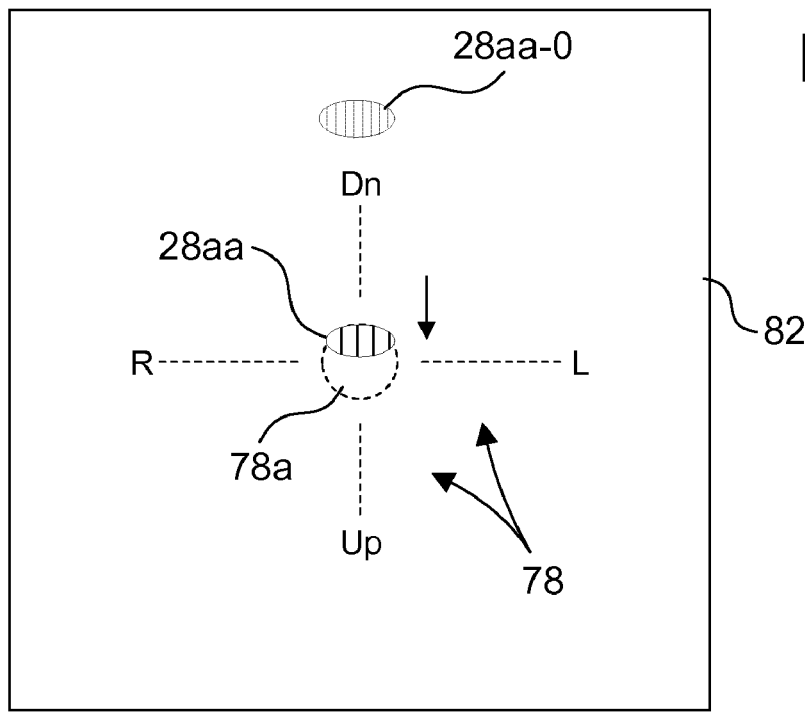
Figure 7D:
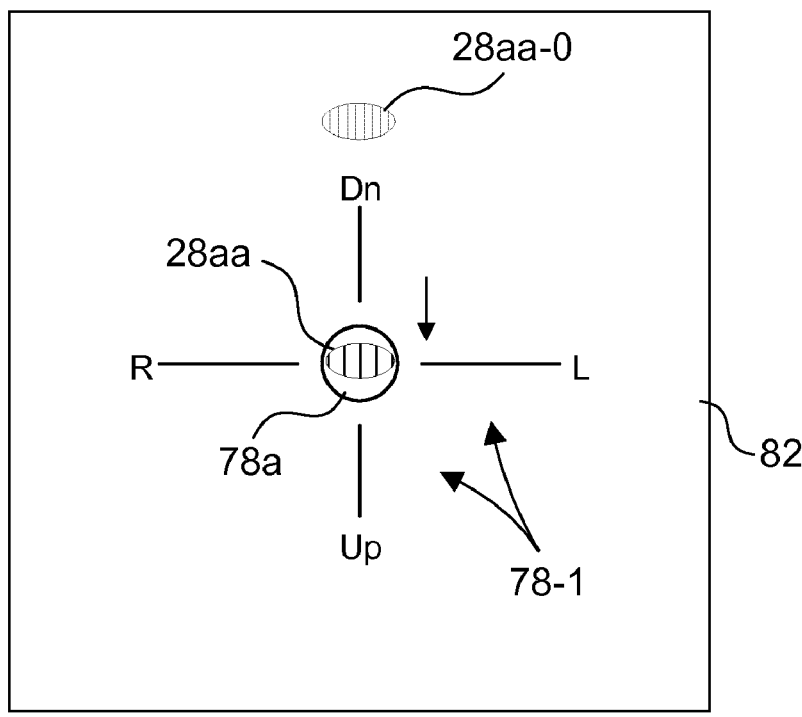
Figure 8:
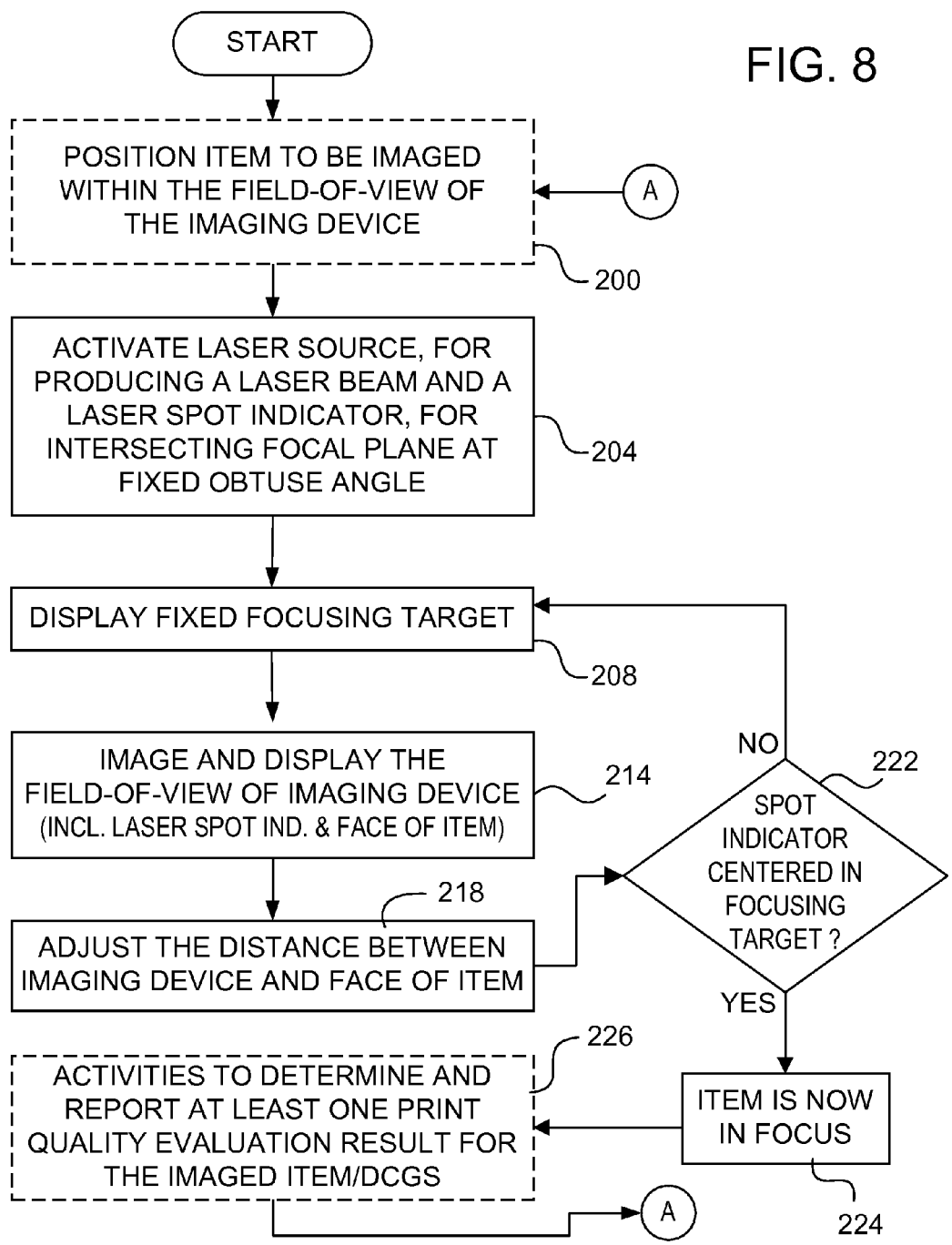
FIG. 8 provides a high level somewhat simplified flowchart of a possibly preferred embodiment of the method of the invention.

Methods of the invention that are supported by the apparatus 10 of FIG. 6A, will be most fully discussed in detail when referring to FIG. 7A through FIG. 8. However, a somewhat simplified list of operating steps may include:

1. placing the face of the item to be imaged upon a provided support surface or table (in a face-up orientation); and 2. employing the UP first operator pushbutton 84A and or the DOWN second pushbutton, as required, for locating a provided laser spot indicator 28*aa* within a center 78*a* of a fixed on-screen focusing target 78; and optionally, 3. process collected image data and produce at least one print quality evaluation result, which is preferably reported to an operator.

Turning now to FIG. 6B, a possibly most preferred embodiment of an imaging and evaluation system 10-1 is provided structured with an imaging and focusing unit 20, which as shown is directly interfaced to a portable computing device 70-1. Examples of contemplated and preferred portable computing devices may include laptop computers, notebook computers, tablets, as well as other available and possibly handholdable embedded computing means. As shown, a communication link 88 may be provided for operatively and functionally coupling the portable computing device 70-1 to the focusing and imaging unit 20. Importantly, if a common laptop or notebook computer is employed, both the operator observable display 80-1, a keyboard (for operator input commands, etc.) 84-1, any required annunciators 86, and industry standard communication channels, may all be provided by the hardware of the portable computing device 70-1 (as depicted in FIG. 6B).

As understood by skilled persons, an operator observable display means may be provided in any of a number of differing embodiments. For example, if a personal computing device 70-1 is employed, the display means may be provided by an integrated flat panel (FP) display. Alternately, other display means may be provided by off-the-shelf display modules (e.g., LCD modules), possibly including touchscreen (TS) functionality. In the latter case, wherein a TS module is included, almost the entire operator/human interface may be provided (with physical pushbuttons omitted).

Regardless of the actual architecture and structure included with the focusing and imaging unit 20, and an associated imaging and evaluation system 10, methods of the present invention are intended to enable a minimally trained operator to readily locate the face of the item to be imaged at the focal plane of the included imaging device. For example, turning to FIGS. 7A through 7D, along with the flow chart of FIG. 8, the methods of the invention will be broadly disclosed. The FIGS. 7A through 7D provide an example sequence of possible adjustments as may be seen upon an operator observable display screen 82, which may be assumed to be shown in somewhat simplified depictions. It is important to note that for clarity purposes, the item being imaged (such as a barcode) is not shown so as to not obfuscate the important focusing features and limitations of the claimed method of the invention. In addition, the descriptions of FIGS. 7A through 8 may be assumed to pertain to the embodiments of FIGS. 3A and 4. However, it should be understood that a dual description may certainly be applied to FIGS. 3B and 5 once a clear understanding of the invention is established.

Turning specifically now to FIG. 7A, it may be assumed that the item of interest (possible a data carrying graphical symbol) has been placed within the field-of-view of the fixed focal length imaging device 24. The depicted and pre-determined fixed on-screen focusing target 78 is shown superimposed upon the image seen via the field-of-view of the imaging device 24. As such, the display screen 82 of FIG. 7A shows the fixed on-screen focusing target 78, along with imaged items included the laser spot indicator 28aa. This initial position of the laser spot indicator 28aa is not nearly positioned within the center 78a of the fixed on-screen focusing target 78. As such, the display screen 82 of FIG. 7A clearly indicates to the operator that the face of the item is not at the focal plane, and focusing adjustments are required. As shown for the embodiments of FIGS. 3A and 4, the location of the laser spot indicator 28aa of FIG. 7A would clearly indicate that the imaging device 24 (and laser source 28) must be raised up, and therefore indicates that the current height (or equivalently the distance between the imaging device and the face of the item) is too small and must be increased.

The depiction of FIG. 7B indicates that an operator adjustment action (e.g., pushbutton presses) has caused the laser spot indicator 28aa to move closer to the center 78a of the fixed on-screen focusing target 78. Being closer to the center 78a indicates that the face of the item is closer to the focal plane, than it was in FIG. 7A.

As the operator continues the height adjusting and focusing process, in FIG. 7C the laser spot indicator 28aa is nearly positioned at the center 78a of the fixed on-screen focusing target 78. Finally, in the depiction of FIG. 7D, the laser spot indicator is substantially positioned within the center 78a of the fixed on-screen focusing target 78, and accurate in-focus imaging and related activities may be effected. Once in-focus imaging has been realized, and associated pixel image data of the item is available, the image data may be employed for producing one or more common print quality evaluation results. It may be noted that the image data collected while determining that the item is now in-focus, and or subsequently collected image data may be employed for determining one or more print quality evaluation results.

Another aspect of the method of the present invention is additionally illustrated in FIGS. 7A through 7D, and specifically depicted in FIG. 7D. As can be seen once the laser spot indicator 28aa is properly and substantially positioned so as to be centered within the first fixed on-screen focusing target 78, a most preferred embodiment of the invention calls for an altering and changing of the first or original focusing target 78 to a second focusing target 78-1 (as shown in FIG. 7D). For example, a method may provide an initial or first focusing target 78 that is red while the laser spot indicator 28aa is not substantially centered within the focusing target. Once the laser spot indicator 28aa is moved and positioned within the center 78a of the first focusing target 78, a second focusing target having a second color, such as green, may be displayed.

In Yet another variation for controlling the focusing target, a first focusing target may be provided as either a blinking indicator or possibly of a first color, and once the laser spot indicator 28aa is properly centered, the focusing target may be altered and made solid or steady, and or of a second color. The original color may be maintained or altered, as desired. Finally, yet other indications may be provided to an operator that the item being imaged is indeed now in-focus. For example, upon the changing of a first focusing target 78 (say of a blinking-red color) to the second focusing target 78-1 (say solid-green), an audio sounder device may additionally be activated to indicate the item is now in-focus.

Turning now to FIG. 8, a high level block diagram of a possibly most preferred embodiment of a method of the invention will be concisely described. As shown, at 200 an operator (or mechanism) places the face of the item to be imaged within the field-of-view of the fixed focal length imaging device 24. If not previously activated, or if a portable battery powered unit, the laser source is activated at 204, causing the laser spot indicator 28aa to be produced upon the face of the item to be focused upon.

At 208, a fixed on-screen focusing target is displayed upon an available and operator observable display. Additionally, at 214, an image of the field-of-view of the imaging device is displayed. The image of the field-of-view will include the face of the item, along with the laser spot indicator 28aa. At 214, if the laser spot indicator 28aa is not centered within the center of the focusing target, at 218 an adjusting of the distance between the imaging device and the face of the item is effected. If at 222, it is determined that the laser spot indicator is not centered, the loop of 208-214-218 is repeated. Once the determination at 222 indicates that the laser spot indicator 28aa is centered, the item is now deemed to be in-focus at 224, and the operator may be notified by changing the focusing target from a first focusing target to a second focusing target, and possibly providing other annunciations. Also, any required imaging and image data collecting activities may be realized at 226 to determine and preferably report at least one print quality evaluation result.

It should be noted that although not shown explicitly, the method of FIG. 8 may include other and additional steps, and also repeat and loop back, as necessary. For example, one contemplated additional step that is not explicitly shown, may be located between current steps 200 and 204, or alternately 204 and 208, would call for an operator pushbutton 'start' keypress being required. So that after an item is placed and centered within the field-of-view, an operator pushbutton press may be required to start the focusing activities. This would enable a looping back with possibly another item placed within the field-of-view of the imaging device, and with another 'start' pushbutton keypress required to repeat the method. Importantly, if an identical item is to be imaged next, the apparatus may realize that focusing is not required (e.g., the laser spot indicator 28aa is centered) and the method may proceed to step 226, if step 226 is included and utilized. Yet other variations of the method of FIG. 8 are certainly possible and within the scope of the present invention.

While there have been described herein a plurality of the currently preferred embodiments of the means and methods of the present invention, those skilled in the art will recognize that other and further modifications may be made without departing from the invention. As such, the foregoing descriptions of the specific embodiments of the present invention have been provided for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A method for adjusting an object distance for focusing a fixed focal length imaging device of a focusing and imaging unit, with the method for focusing including the steps of:
    a) placing an item to be imaged within the field-of-view of the fixed focal length imaging device;
    b) producing a laser beam that is aimed at the focal plane of the imaging device, with the laser beam intersecting the focal plane at an oblique angle, for providing a laser spot indicator;
    c) wherein a current position of the laser spot indicator will be determined by the distance between the imaging device and the face of the item being imaged;
    d) displaying each of:
        i) an image of the item placed within the field-of-view of the imaging device;
        ii) the laser spot indicator, which is imaged along with the item placed within the field-of-view of the imaging device; and
        iii) a fixed on-display pre-determined focusing target, which is provided such that once the laser spot indicator is moved and positioned within a center of the focusing target, the item that was placed within the field-of-view of the imaging device is now in-focus and ready for imaging activities;
    e) adjusting the distance between the imaging device and the face of the item being imaged, along an axis that is substantially parallel to an optical axis of the imaging device, for causing a moving of the position of the laser spot indicator toward a center of the on-screen focusing target;
    f) repeating step-d and step-e, above, until the laser spot indicator is substantially positioned within the center of the focusing target, thereby causing the item being imaged to be located at the focal plane, for subsequent in-focus imaging activities.

2. The method in accordance with claim 1, wherein the step placing an item to be imaged within the field-of-view of the fixed focal length imaging device results in:
    a) placing the item upon a support base of a focusing and imaging unit, with the face of the item to be imaged being oriented upwardly; and
    b) locating a center portion of the face of the item proximate to the optical axis of the imaging device.

3. The method in accordance with claim 1, wherein upon the positioning of the laser spot indicator within the center of the focusing target, indicating that the item is now in-focus, at least one of the following occurs:
    a) recently collected image data of the item is employed for producing a print quality evaluation result; and
    b) an additional step is included wherein the item is again imaged by the imaging device, causing imaging data to be collected and employed for producing a print quality evaluation result.

4. The method in accordance with claim 1, wherein the steps involving a displaying of the focusing target includes:
    a) providing and displaying a first focusing target while the laser spot indicator is not positioned within the center of the focusing target; and
    b) changing the first focusing target to a second focusing target upon a positioning of the laser spot indicator within the center of the focusing target.

5. The method in accordance with claim 4, wherein the step of displaying the first focusing target involves using a first color indicating that the item is not positioned at the focal plane and that the distance between the imaging device and the face of the item must be adjusted.

6. The method in accordance with claim 5, wherein the changing from the first focusing target to the second focusing target involves a change from a first color to a second color.

7. The method in accordance with claim 1, wherein the step involving the displaying of the focusing target includes:
    a) providing a first focusing target that is a blinking target while the laser spot indicator is not positioned within the center of the focusing target; and
    b) changing the first blinking focusing target to a second focusing target upon a positioning of the laser spot indicator substantially within the center of the focusing target, wherein the second focusing target is at least one of:
        i) displayed as a solid non-blinking focusing target;
        ii) displayed using a color that is different to the original color used to display the blinking focusing target; and
        iii) displayed as a second blinking focusing target that blinks at a different rate than the first blinking focusing target.

8. The method in accordance with claim 7, wherein the changing from the first focusing target to the second focusing target involves changing from a red focusing target to a green focusing target, respectively.

9. The method in accordance with claim 7, wherein upon the changing of the first focusing target to the second focusing target, an audio sounder is activated to indicate the item is now in-focus and print quality evaluation activities may commence.

10. A method for focusing upon a face of a data carrying graphical that is placed within a field-of-view of a fixed focal length imaging device, wherein the focusing is realized by adjusting a distance between the imaging device and the face of the data carrying graphical symbol, with the method for focusing including the steps of:
    a) activating a laser source for producing a laser beam and an associated laser spot indicator, with the laser beam aimed and aligned at a fixed oblique angle such that the laser beam intersects the face of the data carrying graphical symbol at a position determined by the distance between the imaging device and the face of the data carrying graphical symbol;
    b) displaying, repeatedly upon an available display means each of the following:
        i) images captured by the imaging device, including laser spot indicator, showing the position at which the laser beam intersects the face of the data carrying graphical symbol; and
        ii) a fixed on-display pre-determined focusing target for indicating where the laser spot indicator must be positioned in order to properly focus the imaging device upon the face of the data carrying graphical symbol for subsequent in-focus imaging activities;

c) adjusting the distance between the imaging device and the data carrying graphical symbol being imaged, along an axis that is substantially parallel to the optical axis, for effecting a moving and positioning of the laser spot indicator so that the laser spot indicator is substantially centered within the fixed on-screen focusing target, thereby indicating that the face of the data carrying graphical symbol is now located at the focal plane of the imaging device, and the data carrying graphical symbol is now properly focused for subsequent imaging and print quality evaluation activities.

11. The method in accordance with claim 10, wherein the step of displaying the focusing target includes:

a) providing a first focusing target, which is displayed while the laser spot indicator is not positioned within the focusing target; and b) changing to a second focusing target whenever the laser spot indicator is positioned substantially within a center of the focusing target.

12. The method in accordance with claim 10, wherein the step of displaying the focusing target includes:

a) providing a first focusing target of a first color while the laser spot indicator is not positioned within the focusing target; and b) changing the color of the first focusing target to thereby provide a second focusing target, which clearly indicates to the operator that the data carrying graphical symbol is now properly in-focus.

13. The method in accordance with claim 10, wherein the step of adjusting the distance between the imaging device and the face of the data carrying graphical symbol being imaged, is realized by one of:

a) having the operator manually adjust the distance between the imaging device and the face of the data carrying graphical symbol to be imaged; and b) providing an electro-mechanical adjustment mechanism wherein the operator can selectively cause an increasing and a decreasing of the distance between the imaging device and the face of the data carrying graphical symbol to be imaged.

14. The method in accordance with claim 10, wherein the step of adjusting the distance between the imaging device and the face of the data carrying graphical symbol being imaged, is realized by a motor driven electro-mechanical assembly for:

a) adjusting automatically the distance between the imaging device and the face of the data carrying graphical symbol, as indicated by the relative position of the laser spot indicator and the center of the fixed on-screen focusing target, until the laser spot indicator is substantially centered within the focusing target; and b) collecting imaging data that is employable for determining and reporting at least one print quality evaluation result.

15. The method in accordance with claim 14, wherein an additional step is provided such that the collecting of the imaging data results in a producing and reporting at least one print quality evaluation result.

16. A method for focusing a fixed focal length imaging device of a focusing and imaging unit structured for enabling print quality evaluation and reporting, with the focusing method comprising the steps of:

a) employing an imaging and focusing unit, including the fixed focal length imaging device, for imaging a face of an item placed within the field-of-view of the imaging device;

b) employing a display means that is coupled to the focusing and imaging unit so that each of the following is simultaneously displayable upon the display means:

i) an image of the face of the item being imaged by the imaging device;

ii) a laser spot indicator, which is projected by a laser source mounted at an oblique angle to the face of an item being imaged, so that parallax focusing technology can be utilized, causing the actual position of the laser spot indicator to be determined by the distance between the imaging device and the face of the item being imaged;

iii) a fixed pre-determined on-display focusing target, having a center for receiving the laser spot indicator when the distance between the imaging device and the face of the item has been set so that the face of the item is located at the focal plane;

c) means to adjust the distance between the imaging device and the item, along an axis that is substantially parallel to the optical axis of the imaging device, causing the moving of the laser spot indicator for positioning the laser spot indicator substantially within the center of the focusing target, and thereby causing at least a portion of the face of the item to now be positioned at the focal plane within the field-of-view of the image device, and ready for subsequent in-focus imaging and print quality evaluation activities.

17. The method in accordance with claim 16, wherein the means to adjust the distance between the imaging device and the face of the item enables one of:

a) an up-down adjusting of the imaging device and the laser source in relation to a stationary item; or b) an up-down adjusting of the object of interest with respect to a stationary imaging device and laser source.

18. The method in accordance with claim 16, wherein the step of employing a display means, includes utilizing a display portion of at least one of:

a) a desktop computer unit;

b) a notebook computer;

c) a tablet computer.

19. The method in accordance with claim 16, wherein the means to adjust the distance between the imaging device and the face of the item, along the axis that is substantially parallel to the optical axis, causing a moving and positioning the laser spot indicator within the center of the focusing target, includes at least one of:

a) a hand operated adjustment structure for causing an increasing or decreasing of the distance between imaging device and the face of the item; and b) a motor driven structure that is activated for causing at least one of an increasing and a decreasing of the distance between the imaging device and the face of the item to be imaged.

20. The method in accordance with claim 16, wherein the step of displaying the focusing target includes:

a) providing a first focusing target of a first color, which is displayed while the laser spot indicator is not suitably positioned within the center of the focusing target; and b) providing a second focusing target, having a different color to the first focusing target whenever the laser spot indicator is positioned substantially within a center of the focusing target.

* * * * *